(No Model.) 2 Sheets—Sheet 1.
J. DUNKIN.
PLANTER.
No. 346,901. Patented Aug. 10, 1886.
*Fig. 1.*
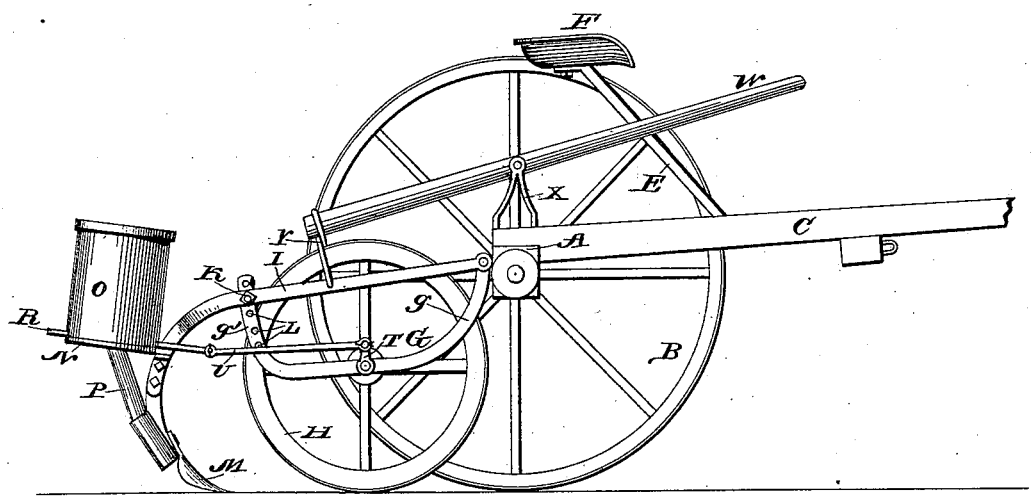
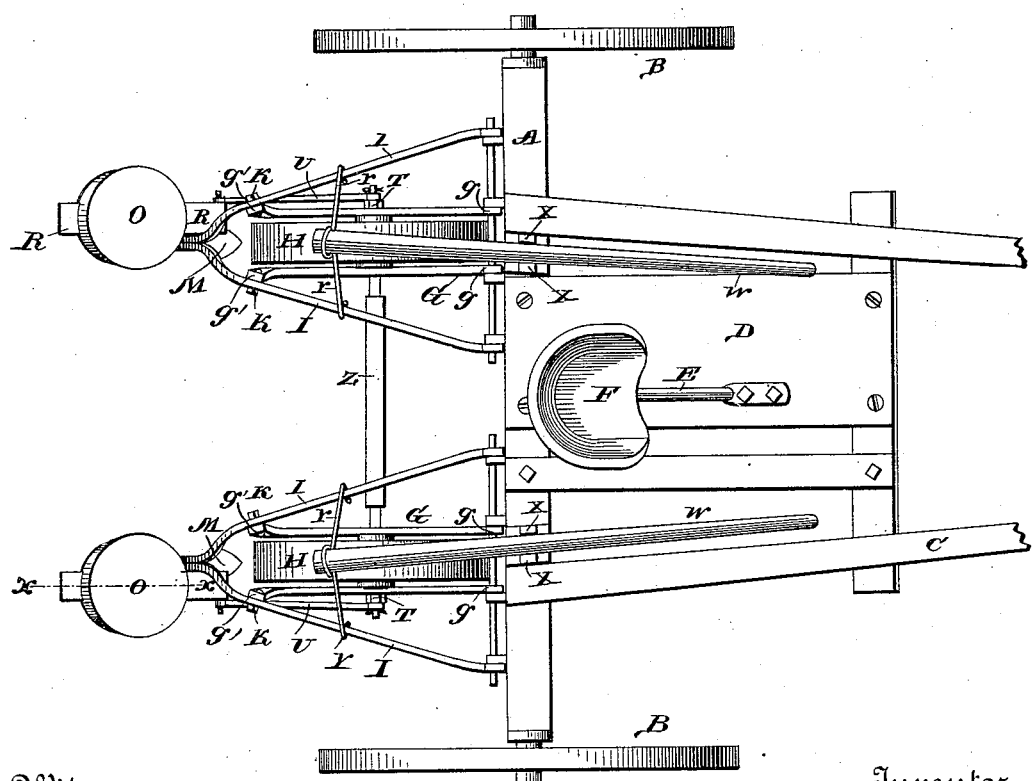
*Fig. 2.*
Witnesses
Percy C. Bowen
E. G. Siggers
Inventor,
James Dunkin
By his Attorneys
C. A. Snow

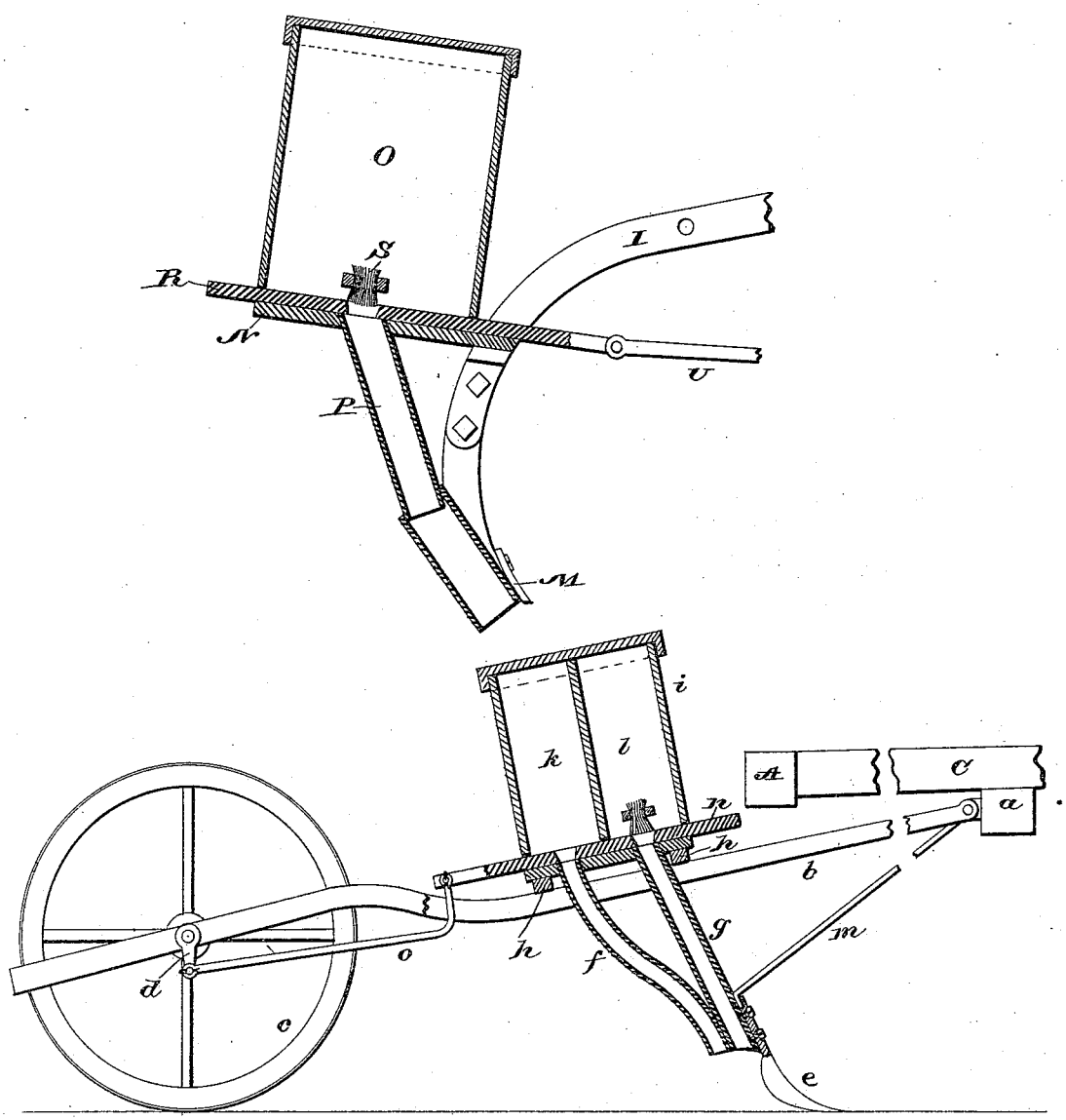

UNITED STATES PATENT OFFICE.

JAMES DUNKIN, OF BRIDGEPORT, WEST VIRGINIA.

PLANTER.

SPECIFICATION forming part of Letters Patent No. 346,901, dated August 10, 1886.

Application filed June 5, 1886. Serial No. 204,248. (No model.)

*To all whom it may concern:*

Be it known that I, JAMES DUNKIN, a citizen of the United States, residing at Bridgeport, in the county of Harrison and State of West Virginia, have invented a new and useful Improvement in Planters, of which the following is a specification.

My invention relates to an improvement in planters; and it consists in the peculiar construction and combination of devices that will be more fully set forth hereinafter, and particularly pointed out in the claims.

In the drawings, Figure 1 is a side elevation of my invention. Fig. 2 is a top plan view of the same. Fig. 3 is a detail section taken on the line $x$ $x$ of Fig. 2. Fig. 4 is a view of a modification.

A represents an axle, which is provided at each end with a large supporting-wheel, B. A tongue, C, or shafts, projects from the front side of the axle. On the said pole or shafts, and on the axle, is supported a platform, D, from which rises a spring-bar, E, that carries a seat, F, for the driver.

G represents a pair of frames, which are each hinged to the rear side of the axle, near opposite ends of the same, and the said frames form bearings for the operating-wheels H. The said wheels have broad rims, and are thereby adapted to be used as rollers. The frames G are each composed of a pair of bent metallic straps forming the upwardly-extending arms $g$ and $g'$. To the axle, on both sides of the arms $g$, are pivoted the bifurcated forwardly-extending arms of plow-beams I. The rear ends of the arms of the plow-beams are attached to the arms $g'$ of the frames, at any desired vertical adjustment, by means of bolts K, that pass through openings made in the said plow-beams, and through either of the vertical series of openings L, with which the arms $g'$, are provided. To the lower ends of the plow-beams, which are curved downwardly, so as to form standards, are attached furrow-opening shovels M.

N represents a circular platform, which is preferably made of iron, and is secured to the curved rear portions of each of the plow-beams, and extends rearwardly therefrom. The said platform supports hoppers O, having openings in their lower sides. Seed-tubes P extend from the said openings to the rear lower sides of the plow-standards in rear of the furrow-openers.

R represents reciprocating seed-slides, which are adapted to move back and forth in the bottoms of the hoppers, and are provided each with a depression or opening forming a seed-cup. Brushes S are located above the said seed-slides and bear upon the same, so as to prevent any more seeds than are sufficient to plant the hill from being discharged from the hopper at a single operation. These seed-slides are actuated by means of cranks T, which are provided for the wheels H, and are connected to the seed-slides by means of pitmen U. By thus pivoting the frames G to the rear side of the axle, and having the plow-beams supported upon the said frames, it will be readily understood that the plow-beams and their planting mechanisms may be raised or lowered independently of each other, and are thus adapted to inequalities of the land. By adjusting the beams I vertically with relation to the frames G the furrow-openers may be caused to run in the ground at any desired depth, and thus regulate the depth at which the seeds are planted. In order to raise the planting mechanism from the ground when the machine is in motion and not in operation, I provide hand-levers W, which are fulcrumed to brackets X, that project from the upper side of the axles. The rear ends of the said hand-levers are attached to the beams I by means of suspending-rods Y.

The seeds are discharged from the hopper twice at each rotation of the wheels H, and at the instant that the cranks T are in a vertical position. It therefore follows that by marking lines across the ends of the field and starting the machine from the said lines, with both the cranks T in a vertical position, the machine may be successfully employed as a check-row corn-planter.

In order to facilitate the operation of the machine, and to enable the driver to ascertain that the cranks are in a vertical position before starting the machine from either end of the field, I propose to paint the spokes of the wheels H which align with the cranks a different color from the remaining portions of the wheels.

In order to insure to synchronous rotation of the wheels H when the machine is used as a check-row corn-planter, I provide a rigid coupling-bar, Z, the ends of which are rigidly attached to the projecting inner spindles of the wheels H, thus compelling the said wheels to rotate simultaneously and at exactly the same rate of speed.

In Fig. 4 I show a modified form of my invention, in which I provide the sulky or frame with a transverse bar, $a$, attached to the tongue or thills, and arranged in front of the axle and parallel therewith. To the rear side of the bar $a$ is pivoted a rearward-extending frame, $b$, in the rear end of which is journaled a driving-wheel, $c$, having the crank $d$. $e$ represents the plow or furrow-opener, the standard of which is formed by two seed-tubes, $f$ and $g$. Cross-bars $h$ connect the side bars of the frame $b$, and on the said cross-bars is supported a hopper, $i$, which is divided by a central vertical partition into two compartments, $k$ and $l$. The upper end of the seed-tube $f$ connects with the lower side of the compartment $k$, and the upper end of the seed-tube $g$ connects with the lower end of the compartment $l$, the lower ends of the said tubes $f$ and $g$ being united above the plow $e$. $m$ represents a brace rod, the upper end of which is pivoted to the transverse bar $a$, and the lower end of which is attached near the lower end of the plow-standard, so as to brace the latter. $n$ represents the seed-slide, which works on the bottom of the hopper, and is provided with two openings adapted to register with the openings in the bottoms of the compartments of the hopper, and also to register with the upper end of the tubes $f$ and $g$ when the seed-slide is reciprocated. In order to actuate the seed-slide, the connecting-rod $o$ is provided, one end of which is attached to the rear end of the seed-slide, and the other end of which is connected to the crank. Seeds are placed in one compartment of the hopper and fertilizer in the other compartment thereof, and when the machine is drawn forward the rotation of the wheel $c$ imparts motion to the seed-slide, thereby causing the latter to discharge both seeds and fertilizer from the hopper at suitable intervals to form hills.

I have herein shown and described only one frame $b$ carrying the driving-wheel and planting mechanism; but it will be readily understood that two of such frames and planting mechanisms will be attached to the main frame or sulky, as in the previous instance.

Having thus described my invention, I claim—

1. The combination, in a sulky-planter, of the pivoted frames G, carrying the trailing-wheels H and the plow beams and standards I, the hoppers mounted on the said beams, and mechanism connecting the wheels H with the hoppers for discharging the seeds therefrom, substantially as described.

2. The combination, in a sulky corn-planter, of the frames G, pivoted thereto, and carrying the trailing-wheels H, the plow beams and standards I, supported by the frames G, and vertically adjustable thereon and carrying the hoppers, and the planting mechanism, substantially as described.

3. The combination, in a sulky corn-planter, of the pivoted frames carrying the trailing-wheels H and the planting mechanisms, the cranks P, connected to and actuating the planting mechanisms, and the coupling-bar Z, for connecting the inner ends of the spindles of the wheels H, and thereby securing synchronous rotation of the said wheels, substantially as described.

4. The combination, with the axle A of the sulky-planter, of the frames G, arranged in rear of the axle, and pivoted at their front ends thereto, the trailing-wheels and seed-boxes carried by the frames G, the seed-chutes, and connecting-rods between the trailing-wheels and the slides of the hoppers, as set forth.

In testimony that I claim the foregoing as my own I have hereto affixed my signature in presence of two witnesses.

JAMES DUNKIN.

Witnesses:
JASPER N. WILKINSON,
I. T. GOLDEN.